Nov. 24, 1959
S. Z. SIWEK
2,914,129
SELF-PROPELLED MOWER
Original Filed Jan. 14, 1959
2 Sheets-Sheet 1
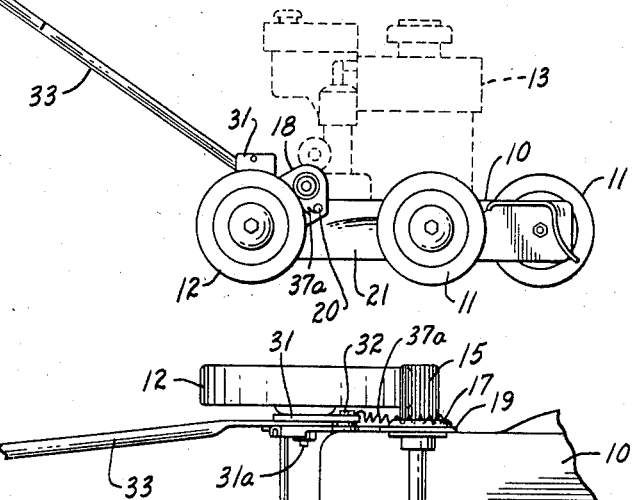
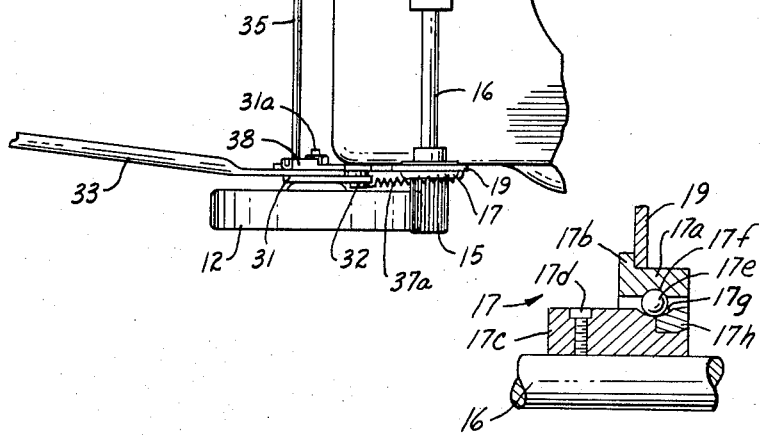
INVENTOR.
STANLEY Z. SIWEK

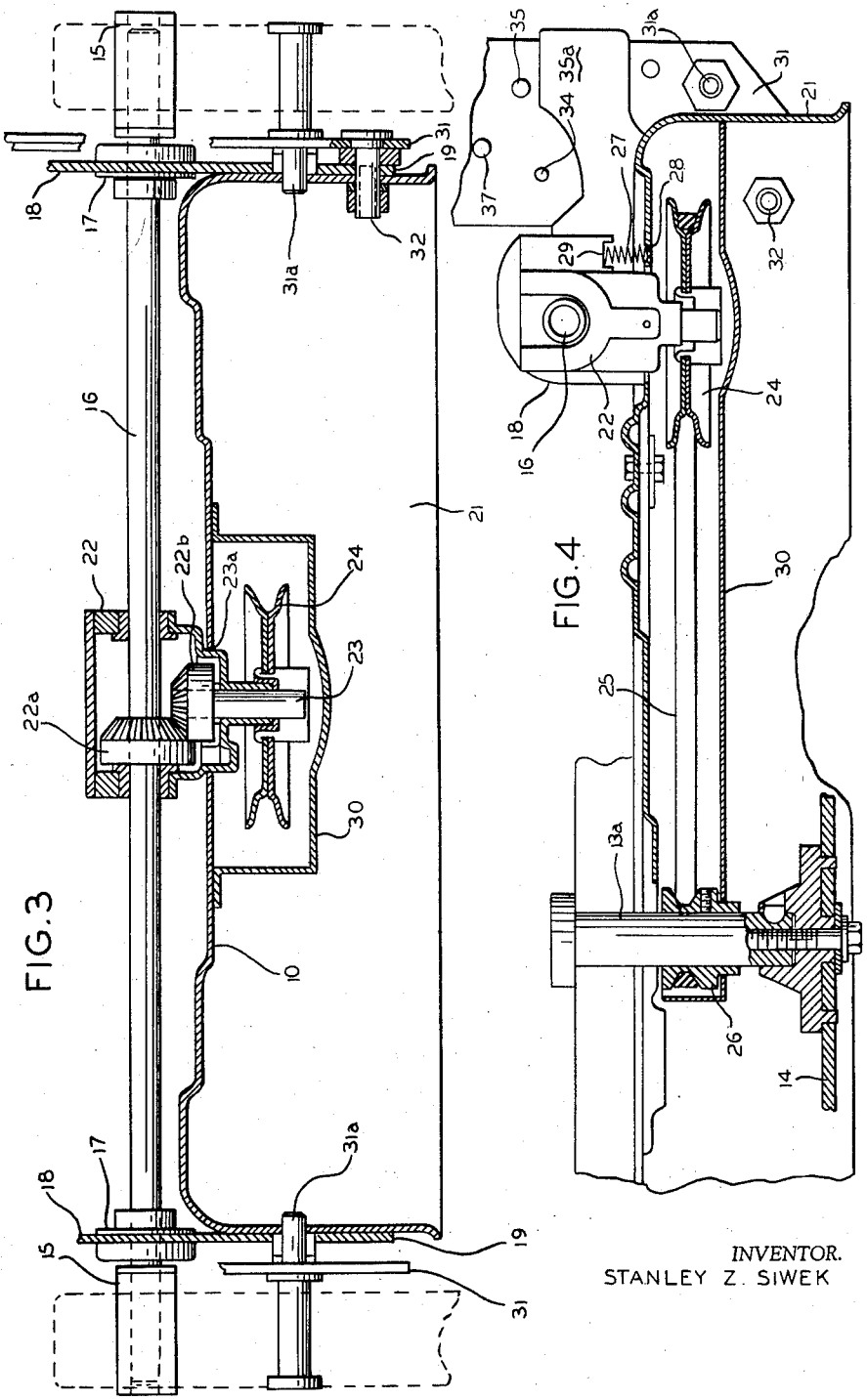

United States Patent Office 2,914,129
Patented Nov. 24, 1959

2,914,129

SELF-PROPELLED MOWER

Stanley Z. Siwek, Chicago, Ill., assignor to Pioneer Gen-E-Motor Corp., Chicago, Ill., a corporation of Illinois Original application January 14, 1959, Serial No. 786,719, now Patent No. 2,896,731, dated July 28, 1959. Divided and this application February 11, 1959, Serial No. 792,637

9 Claims. (Cl. 180—74)

This invention is directed to power tools and particularly relates to power mowers of the type using a wheel supported base and a cutter bar rotated on a vertical axis. This application is a division of my copending application, Serial No. 786,719, filed January 14, 1959, now Pat. No. 2,896,731.

Tools of this class are oftentimes propelled over the supporting surface by hand. If they are provided with a propulsion system driven from a motor on the wheel supported base, it is highly desirable to provide a simple, convenient and inexpensive system for disconnecting the drive from time to time, so as to enable free wheeling of the base, without requiring stopping of the motor in order to stop the tool.

One purpose is to provide a simple rear wheel mounting and driving means therefor in a mower of the type described.

Another purpose is to provide a simple and efficient overload release system for the wheel drive system of such tools and which not only breaks the drive upon overload, but also maintains proper tension on a pulley and belt used in the drive while allowing easy assembly of the drive.

Other objects and purposes will become apparent from the specification and claims which follow when taken with the accompanying drawings, in which:

Figure 1 is a side view of the mower embodying the present invention;

Figure 2 is a top view of the mower shown in Figure 1;

Figure 3 is a rear view of the mower of Figure 1 certain parts being broken away and other parts being shown in section for purposes of clarity;

Figure 4 is a longitudinal section view;

Figure 5 is a sectional view of a bearing element.

Referring particularly now to the drawings wherein like elements are designated by like characters throughout and in the first instance to Figure 1, 10 illustrates a mower base supported by front wheels 11 and rear wheels 12. A motor 13 is mounted on the upper surface of the base or platform and has a vertical output shaft 13a connected to a rotary cutting blade 14 beneath the platform. It should be understood that the showing of the platform or base 10, motor 13 and cutting blade 14 are representative of the type of tool in which the present invention is applicable.

In order to impart driving power to the rear wheels 12, a pair of generally cylindrical frictional driving elements 15 are carried by a driven shaft 16 and positioned on opposite sides of the base 10 for a driving frictional engagement with the rear wheels 12. Shaft 16 is rotatably supported in self-aligning bearings 17 which are supported in upstanding projecting portions 18 of bearing plates 19. The bearing plates 19 are fixed to and integral with the base, as by means of suitable bolts or the like 20 and 32 which hold the sides of the plates against the depending skirt 21 of the base.

The bearings 17, as will be seen best in Figure 9, each include an outer race 17a which is fixed to its bearing plate 19. The outer race 17a may have a flange 17b which bears against the inner side of the bearing plate. An inner race 17c is fixed to the shaft 16 as by means of the set screw 17d. A set of balls 17e are spaced circumferentially of the inner race and outer race. The balls 17e ride in a groove 17f, the curvature of which closely conforms to the curvature of the balls 17e and which extends around the shaft facing surface of the outer race. The balls also ride in a groove 17g which extends around the peripheral wall of the inner race. The groove 17g has a width (taken parallel to the axis of shaft 16) which is greater than the width of the groove 17f. The groove 17g may be formed on a radius greater than the radius of groove 17f.

By forming the bearings in this manner, the base 10 which may be made from a metal stamping, may twist or undergo some distortion without binding the drive shaft 16 in the bearings. The spaced surfaces of the inner and outer race along with the larger groove in one race permit such twisting while maintaining the balls in rolling contact with the grooves, and the driving elements in engagement with the wheels.

The inner race may be comprised of two sections 17c and 17h to thereby facilitate assembly, the two sections together defining the walls of groove 17g.

The opposed surfaces of the races and the greater width of one groove may be such as to permit an inclination between the axis of the races of approximately five degrees or so and correspondingly accommodate the distortion of the base from the condition desired and attendant misalignment of the bearing plates 19 which produces such inclination.

The driving elements 15 may have grooves cut in the surface thereof so as to enhance the frictional engagement with the wheels.

The drive system includes a simplified means for driving the shaft 16 from the motor 13 while automatically discontinuing the drive upon the occurrence of an overload in the system. A gear housing 22 is swingably mounted and supported on the shaft 16 above the base 10 and supports a depending pulley shaft 23 which extends perpendicularly to shaft 16 and is rotatably supported in the housing 22. Bevel gears 22a and 22b are fixed to the shafts 16 and 23, respectively, and positioned in the housing 22 for engagement with one another. The shaft 23 extends through an aperture 23a in the base and carries a pulley 24, which is fixed to the lower end of the shaft. Aperture 23a is enlarged, as seen in Figure 4, so as to allow forward and rearward swinging movement of the shaft 23 and housing 22 therein. Sliding movement of the housing on shaft 16 is prevented by the engagement of the lower portion of the housing with the longitudinally extending side walls of aperture 23a. A belt 25 is passed around pulley 24 and a pulley 26 on the shaft 13a so as to complete the driving connection between the motor 13 and rear wheels 12. As the pulley 24 swings forwardly about the axis of the shaft 16, the tension on the belt is decreased while as the pulley swings rearwardly, the tension on the belt is increased.

The system includes a yieldable means for taking up slack and maintaining the proper tension on the belt 25 for adequate driving power while at the same time providing the overload release aforementioned. The yieldable means is in the form of a coiled compression spring 27 which is seated in a recess 28 in the upper surface of the base and in a recess 29 in the under surface of the rear portion of the housing 22 so as to bias the rear portion of the housing upwardly with relation to the base and thereby bias the pulley 24 rearwardly or in a belt tightening direction.

A belt and pulley guard plate 30 is positioned underneath the belt 25 and pulley 24 so as to shield the drive against clippings, stones or the like which may be thrown upwardly by the cutting blade 14 during rotation thereof.

Operator control of the propulsion system is attained by a wheel mounting and linkage system for the rear wheels. The rear wheels 12 are journalled for rotation in mounting plates 31 which are positioned outboard of the bearing plates 19 and spaced a small distance therefrom, as is seen best in Figure 3. Axles 31a are fixed to the mounting plates and rotatably support the wheels 12 thereon. The mounting plates 31 are rotatably mounted on studs 32 carried by the bearing plates 19 and passed through the skirt 21. The wheel axes are so positioned with relation to the axes of the mounting plates pivot studs that the weight of the base and motor assembly forces the pivot studs downwardly, thus swinging the wheel axes forwardly until driving contact with the driving elements 15 is attained as seen in Figure 5.

An operator actuated controlling and guiding handle 33 is swingably mounted on pivot pins 34 which project inwardly from the wheel mounting plates 31. Each side of handle 33 is adapted to rest upon an abutment 35, which takes the form of a rod fixed to the mounting plates and extending transversely thereto. Handle 33 extends upwardly and rearwardly from the base in the normal operating position of Figure 5. The rod is limited in downward movement by stop portions 35a of the bearing plates 19, such portions projecting upwardly from the base at positions located rearwardly of the normal position of the handle pivots.

When the outer end of the handle is depressed, a downward force is exerted on rod 35 and the side portions of the handle in effect become unitary with the mounting plates so as to pull the mounting plates and rear wheels 12 away from the driving elements 15, thus stopping propulsion. The handle has a weight such that when it rests upon abutment 35, it imparts a force sufficient to break the driving engagement between the rear wheels 12 and driving elements 15.

In some situations greater driving power than normal may be desired. To accomplish this, additional abutments 37 in the form of pins are carried by the wheel mounting plates at locations above the handle side portions. By swinging the handle upwardly, the handle side portions are caused to engage the pins 37 and the wheel mounting plates are thereby moved forwardly a further distance to force the wheels more firmly against the driving elements. Tension springs 37a are connected between the wheel mounting plates 31 and a forward portion of the bearing plates 19 so as to bias the wheels 12 into engagement with the driving elements 15.

Latching elements 38 are carried by the handle pivots for selective engagement with cooperating latching elements on the bearing plates 19 in order to hold the wheels away from the driving elements 15 when desired.

Whereas I have shown and described an operative form of the invention, I wish it to be understood that this showing and description thereof are to be taken in an illustrative or diagrammatic sense, and since modifications which fall within the scope and spirit of the invention will be apparent to those skilled in the art, the invention shall be limited only by the scope of the hereinafter appended claims.

The use and operation of the invention are as follows:

I illustrate an operator controlled mower which uses the operator's more or less natural reactions for controlling the drive system. If the operator, for example, desires more power as when moving up an incline or when encountering heavy growths of weeds or the like, the operator's natural instinct for a helpful push will raise the handle upwardly to engage the lugs 37 for a more firm engagement between the driving elements and rear wheels. If the operator desires to stop the mower, he simply uses his natural reaction of pulling rearwardly on the handle to depress same as the mover moves forwardly until the handle side portions engage the abutment 35 and causes a disengagement of the driving elements from the rear wheels.

The drive system is protected against overloading thereof by the swingable mounting of the drive shaft 23, the shaft 23 and driven pulley 24 moving toward the driving pulley 26 to disconnect the belt drive when an overload occurs. Spring 27 not only maintains the proper tension on the belt 25 but automatically takes up slack as the belt wears and stretches during use.

The particular overload and belt tensioning assembly is easily assembled by mounting the shaft 16 on the mower base and simply snapping the spring into position. The particular mounting of the power shaft 16 and gear housing 22 is highly advantageous from the standpoint of avoiding binding of the power shaft 16 which may be due to distortions of the base or platform 10. In this connection the supporting bearings for the power shaft 16 allow angular displacement of the axis of the shaft 16 relative to the base to a limited extent. Since the housing 22 is mounted on and supported from the power shaft 16, the housing 22 may move upwardly and downwardly relative to the base to a minor extent as limited by the abutment of the housing 22 with the upper surface of the platform 10. Thus in the event of distortion of the base, the particular bearings permit such distortion while still supporting the power shaft 16 and without binding the same, the suspension of the gear housing 22 on the shaft 16 also permitting such distortion without binding the power shaft in the region of the gear housing.

It should be understood that, if desired, a fixed or adjustable stop in the form of a set screw or the like may be substituted for the spring 27 in order to hold the gear housing and pulley in the proper belt tightened position although such a fixed stop will not provide the overload release function aforementioned.

I claim:

1. A self-propelled tool including a tool carrying base and front and rear supporting wheels therefor, a drive shaft for driving a pair of said wheels, power means on said base for rotating said shaft, spaced supporting bearings for said shaft and positioned on opposite sides of said base, each bearing including an outer race supported on said base and an inner race fixed to said shaft, and a series of balls received in grooves formed on the spaced and opposed surfaces of said inner and outer race and in rolling engagement therewith, one groove of a race of each bearing having a radius of curvature greater than the radius of curvature of the groove in the other race of the bearing, said other groove having a curvature closely conforming to the curvature of said balls, said one groove of each bearing having a width such as to permit inclination of the axis of said shaft of a limited extent relative to the axes of said outer races.

2. The structure of claim 1 wherein said base is formed from a metal stamping and each outer race is supported in a bearing plate fixed to and upstanding from said base.

3. In a self-propelled tool of the type including a wheel supported tool carrying base, rotary frictional driving elements carried by said base and engageable with said wheels for propelling said base, said elements being carried by a driven shaft, means selectively causing a driving engagement between said wheels and said elements, means for rotatably supporting said driven shaft above said base, a pulley and a drive shaft supported and suspended from said driven shaft, said drive shaft supporting said pulley and being driven thereby, bevel gears establishing a driving connection between said driven shaft and drive shaft and means holding said gears in engagement while allowing swinging movement of said pulley and drive shaft about the axis of said driven shaft, said pulley being positioned beneath the upper portion of said base, a power means on said base, said power means having a pulley positioned beneath the upper portion of said base, a drive belt between said pulleys so that the belt exerts a force tending to swing said first named pulley about the axis of said driven shaft and toward said power means, and a spring positioned to oppose said force so as to maintain the drive between said pulley and belt during normal loads between said elements and said wheels while allowing swinging movement of said pulley and disengagement of the driving connection between the belt and pulley upon overload.

4. The structure of claim 3 wherein said holding means is in the form of a gear housing and said spring is in the form of a coiled compression spring which is seated in a recess in the upper portion of said base and an opposed recessed portion of said housing.

5. In a self-propelled system for power operated tools of the rotary mower type having a tool supporting base and a motor on the base for operating the tool, the improvement comprising a driven shaft and means effecting a driving connection between the shaft and supporting wheels for said base, supporting bearings for said shaft, each bearing having pairs of races and balls in rolling engagement therewith, one groove of a race of each bearing having a radius of curvature greater than the radius of curvature of the other groove in the other race of the bearing, said other groove having a curvature closely conforming to the curvature of said balls, thereby permitting variant angular dispositions of the axis of said shaft of limited extent relative to said base, a gear housing supported on said shaft and swingably mounted thereon, said gear housing supporting a pulley shaft therein and having gears therein driving said driven shaft from said pulley shaft, a pulley on said pulley shaft and a drive belt leading from said motor to said pulley, said drive belt being tensioned so as to tend to swing said gear housing in one direction, and resilient means biasing said housing in the opposite direction.

6. A self-propelled tool including a wheel supported tool carrying base and a rotary power transmitting shaft supported on and above said base and having friction drive elements adapted for operative driving connection with supporting wheels for said base, means selectively causing a driving engagement between said elements and wheels, a gear housing rotatably supported on said shaft for swinging movement with respect to said base, a pulley shaft supported on and suspended from said gear housing and extending transversely thereto, said housing having bevel gears interconnecting said power transmitting shaft and said pulley shaft whereby said pulley shaft drives said power transmitting shaft, a drive belt between a pulley on said pulley shaft and a pulley driven by a power means on said base whereby swinging movement of said gear housing and pulley in one direction is limited by the tension in said drive belt, said pulleys and drive belt being underneath the upper portion of said base, a spring between said gear housing and base and opposing the force of said drive belt while yieldably limiting movement of said gear housing in the opposite direction, the full weight of said gear housing being supported by said power shaft whereby said housing is positioned in consonance with the disposition of said power shaft and the opposed forces of said belt and spring independently of the planar disposition of said base, said spring being effective to automatically take up slack on said drive belt during operation thereof so as to maintain the same under tension while providing an overload release by allowing said gear housing and pulley to swing against the force of said spring upon occurrence of an overload.

7. A self-propelled tool including a wheel supported tool carrying base, rotary driving elements carried by said base and means for driving said wheels from said elements to thereby propel said base, selective means for making and breaking the drive between said wheels and elements, said elements being carried by a driven shaft, means for rotatably supporting said driven shaft on said base, a pulley carried by a drive shaft, said drive shaft being supported for swinging movement on and suspended from said driven shaft in depending relation thereto while extending transversely to said driven shaft, gear means between said drive shaft and driven shaft, a drive belt between a pulley driven by a power means on said base and said first named pulley, said pulleys and drive belt being beneath said power means and the upper portion of said base, and means for positioning said drive shaft and first named pulley at an operative angular position relative to said driven shaft and limiting swinging movement of said drive shaft and first named pulley, said last named means consisting only of said belt and a resilient means opposed thereto, said belt being effective to exert a force tending to swing said first named pulley about said driven shaft in one direction while limiting movement of said pulley in the opposite direction, said resilient means limiting movement in said one direction and opposing said force so as to maintain the drive between said pulley and belt during normal loads between said elements and said wheels while allowing swinging movement of said drive shaft and disengagement of the driving connection between the belt and pulley upon overload, said resilient means being effective to take up slack and maintain driving tension on said belt after stretch of the belt during operation.

8. The structure of claim 7 wherein said drive shaft depends from a gear housing carrying said gear means, and said gear housing is swingably mounted on said driven shaft.

9. The structure of claim 7 wherein said drive shaft extends downwardly through an opening in said base, said pulley is positioned beneath said base, and said resilient means is in the form of a compression spring seated on the base and in biasing engagement with a housing containing said gear means.

References Cited in the file of this patent

UNITED STATES PATENTS

| | | |
|---|---|---|
| 2,188,251 | Nelson | Jan. 23, 1940 |
| 2,604,747 | Bash | July 29, 1952 |
| 2,701,436 | Harnett | Feb. 8, 1955 |
| 2,860,473 | Wehner | Nov. 18, 1958 |